United States Patent
Gimate-Welsh

(10) Patent No.: US 9,711,118 B2
(45) Date of Patent: Jul. 18, 2017

(54) MUSIC DISSECTION AND PUZZLE

(71) Applicant: Tonatiuh Adrian Gimate-Welsh, Brooklyn, NY (US)

(72) Inventor: Tonatiuh Adrian Gimate-Welsh, Brooklyn, NY (US)

(*) Notice: Subject to any disclaimer, the term of this patent is extended or adjusted under 35 U.S.C. 154(b) by 0 days.

(21) Appl. No.: 15/183,889

(22) Filed: Jun. 16, 2016

(65) Prior Publication Data

US 2016/0314771 A1  Oct. 27, 2016

(51) Int. Cl.
*A63H 5/00* (2006.01)
*G10H 1/00* (2006.01)
*A63F 13/44* (2014.01)
*A63F 13/31* (2014.01)
*A63F 13/814* (2014.01)
*A63F 13/23* (2014.01)

(52) U.S. Cl.
CPC ........... *G10H 1/0008* (2013.01); *A63F 13/31* (2014.09); *A63F 13/44* (2014.09); *A63F 13/814* (2014.09); *A63F 13/23* (2014.09); *A63F 2300/8047* (2013.01); *A63F 2300/8094* (2013.01); *G10H 2210/056* (2013.01); *G10H 2210/061* (2013.01); *G10H 2220/111* (2013.01); *G10H 2220/126* (2013.01); *G10H 2220/135* (2013.01)

(58) Field of Classification Search
CPC .................................................. G10H 1/0008
USPC ............................................................ 84/609
See application file for complete search history.

(56) References Cited

U.S. PATENT DOCUMENTS

| | | | | |
|---|---|---|---|---|
| 6,245,982 B1 * | 6/2001 | Suzuki | ................. | G09B 15/002 84/477 R |
| 6,353,170 B1 * | 3/2002 | Eyzaguirre | .......... | G10H 1/0025 345/474 |
| 6,740,802 B1 * | 5/2004 | Browne, Jr. | ......... | G10H 1/0025 84/609 |
| 7,601,904 B2 * | 10/2009 | Dreyfuss | ................ | G09B 15/00 84/600 |
| 8,420,923 B1 * | 4/2013 | Choi | ........................ | G10H 1/32 84/476 |
| 2012/0312145 A1 * | 12/2012 | Kellett | ..................... | G10H 1/38 84/613 |
| 2014/0140536 A1 * | 5/2014 | Serletic, II | ............ | G06F 3/0481 381/98 |

* cited by examiner

*Primary Examiner* — Jianchun Qin
(74) *Attorney, Agent, or Firm* — Michael J. Feigin, Esq.; Feigin and Fridman

(57) ABSTRACT

A musical composition in broken down by instrument or channels within the composition. The composition is further broken down by time period. Each distinct block of time by instrument is a discrete block within the musical composition for which a visualization is created based on the sound produced. These blocks are then scrambled, at least partially, by instrument and time and displayed on a grid where each block or instrument can be played by selecting same. The blocks are also movable with a goal of placing the blocks in order by time and instrument so that the entirety of the musical composition can again be played aurally.

14 Claims, 5 Drawing Sheets

MUSIC DISSECTION AND PUZZLE

FIELD OF THE DISCLOSED TECHNOLOGY

The disclosed technology relates generally to components of music and, more specifically, to a method for shuffling and putting back together a musical composition.

BACKGROUND OF THE DISCLOSED TECHNOLOGY

Music appreciation, composition, and understanding of the components of musical parts have value for education, appreciation of life, and the conversion of analytical data to something greater—an emotional feeling. Something greater is created from the individual mathematical components of music. To understand the component parts of the symphony, song, or other compilation, one needs to be able to "play" with them and work with them. Hands on experience is often the best way to the understanding of anything.

Various tools are available to the musical composer. One can add music channels or instruments (used interchangeably in this disclosure) from individual samples and put together an entire compilation. However, how does one take it apart? One can view the "code" behind the music and see individual instruments, but a more interactive way of separating music into its parts and working with them would lend people a greater understanding of what goes into the music. As in the case of a sculpture, if one could see the individual components as they were sculpted, one could recombine these pieces and produce a new work of art.

The disclosed technology sets out to do the above with music, as will be described below.

SUMMARY OF THE DISCLOSED TECHNOLOGY

A method of creating a visual display and output of a musical composition involving musical instruments is made by dividing the musical arrangement into individual instruments (channels) and further dividing the musical arrangement into a plurality of distinct time blocks, such that an individual block is created for each of the individual instruments at a given range of time during the musical arrangement. A visual output of sound waves for each individual block is created, and such a block is selectable. A grid with a number of rows corresponding to a number of individual instruments, and columns corresponding to a number of distinct time blocks for each individual instrument is created for outputting the visualization of the sound waves/each block there-on. These blocks, however, are exhibited such that at least one, a majority of, or substantially all of the individual blocks, is shown with an incorrect time and/or instrument within the musical arrangement. Upon receipt of a selection of at least one individual block, the sound associated with this block is outputted. In embodiments, each row of the grid has indicia representative of an instrument of the individual instruments, and an output of sound associated with a block in such a row is for a different or incorrect instrument. Upon an instrument being selected, individual blocks in a row with the instrument are played, whether or not they are associated with this instrument or another.

In embodiments of the disclosed technology, individual blocks are moved between one position and another, such as by receiving a selection of a block at a first location and a second location on the grid to place the block, and then swapping blocks at the first and second location with each other. Each individual block outputted on the grid is then, in embodiments, rearranged, such that each block is in the same row as others of a particular instrument from among the individual instruments. They can also be arranged in time order. A musical composition is reconstructed after the blocks are placed in a same row as other blocks with the same instrument and in the correct time order.

Another way of describing the above/further embodiments of the disclosed technology includes a method of scrambling and ordering a musical composition. This is accomplished by breaking down a digitally stored version of the musical composition into blocks per instrument and per period of time, such that each block has sound for one instrument and one period of time. A visual representation associated with each block is created. A visual representation of each block in a first order other than a linear time order of the musical composition is made and, upon receipt of a selection of a visual representation for one of the blocks, a portion of the musical composition associated with the selection of one of the blocks is played. In the first order, at least some of the visual representations of the blocks from different instruments are adjacent to each other.

The visual representation for some or all of the blocks shows amplitude and period of sound waves for a respective block, in embodiments of the disclosed technology. The visual representations of blocks can be on a grid with each period of time on one axis, and each instrument on another axis. The visual representation of each block can be swappable in position on the grid with another such block by sending a selection of a block in a new position for the block. Upon receiving an indication that two blocks are to be swapped in position on the grid, this is done, and a new version of the output is made, playing a row of block changes to accommodate the new visual output. A selector for a row of the grid can be provided and, upon receiving data indicating a selection of the selector, audio associated with each visual representation within the row is played in an order exhibited in the grid.

The musical composition, in its entirety, is played aurally upon each visual representation being placed in a correct time period and with a correct instrument in the grid.

Any device or step to a method described in this disclosure can comprise, or consist of, that of which it is a part, or the parts which make up the device or step. The term "and/or" is inclusive of the items which it joins linguistically and each item by itself.

DETAILED DESCRIPTION OF EMBODIMENTS OF THE DISCLOSED TECHNOLOGY

A musical composition is broken down by instrument or channels within the composition. The composition is further broken down by time period. Each distinct block of time by instrument is a discrete block within the musical composition, for which a visualization is created based on the sound produced. These blocks are then scrambled, at least partially, by instrument and time and displayed on a grid, where each block or instrument can be played by selecting same. The blocks are also movable with a goal of placing the blocks in order by time and instrument, so that the entirety of the musical composition can again be played aurally.

Embodiments of the disclosed technology are described below, with reference to the figures provided.

Figure 7:
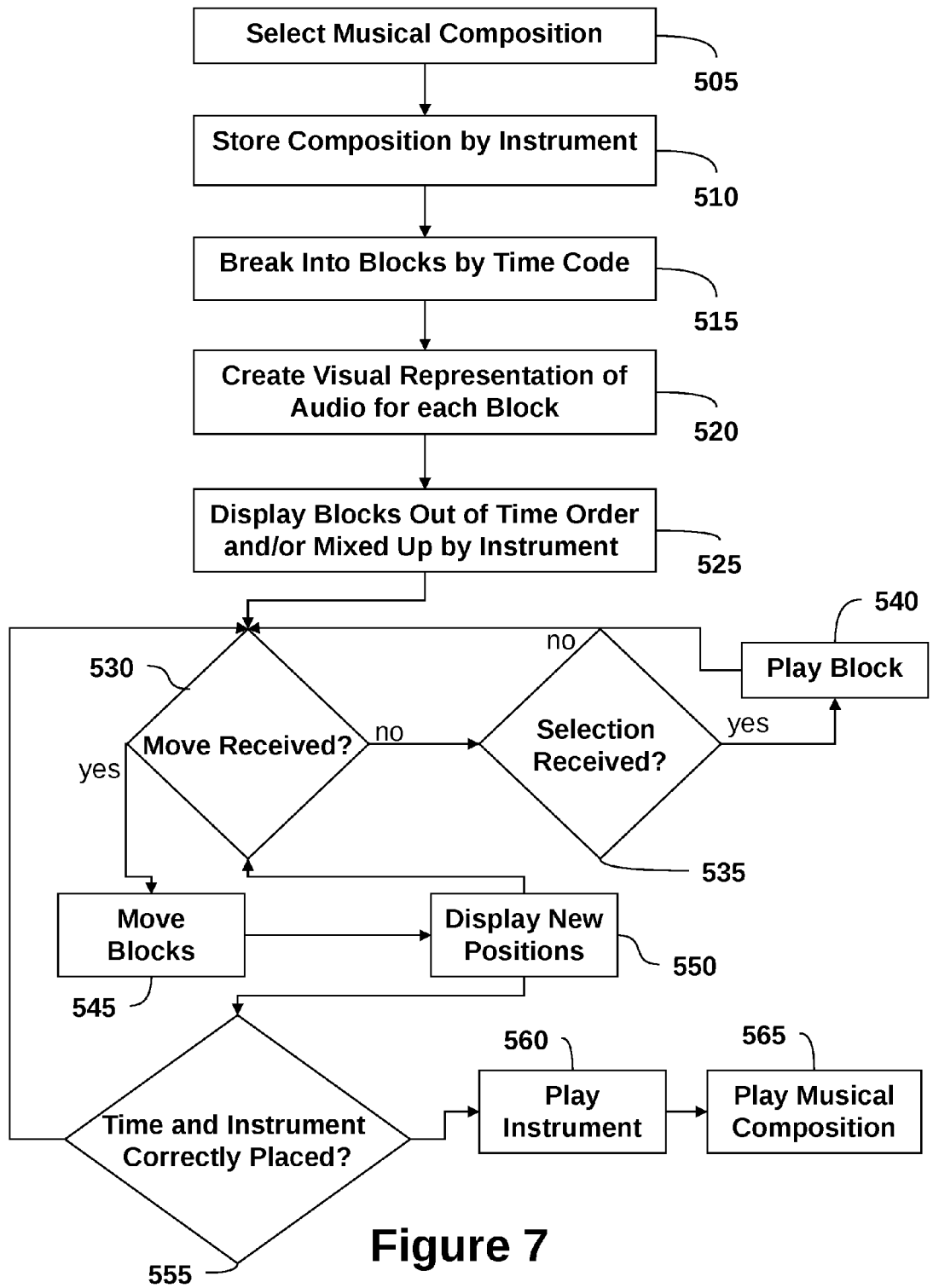
FIG. 7 is a high level flow chart depicting how methods of the disclosed technology are carried out.

FIG. 7 will be described first. FIG. 7 is a high level flow chart depicting how methods of the disclosed technology are carried out. The steps described are carried out by a device, such as that pictured in FIG. 8, which has sound output (such as a speaker) and visual output (such as a display). An input is also required to manipulate what is shown, in order to change the visualization and sound. The sound is stored as a whole for a musical composition, and in parts, where the parts are stored separately or generated dynamically (as required at the time). Specific digital samples of the musical composition are played back during the course of carrying out embodiments of the disclosed technology, and thus, a specialized machine capable of playback of recorded samples, instruments, or portions of music is required to carry out embodiments of the disclosed technology.

In a first step 505, a musical composition is selected. This can be a song, voice recording with different samples which are played at the same time, or a combination thereof. The composition is stored, in accordance with the instrument, in step 510. This can be storage in volatile or non-volatile memory. This storage can be storage representative of the actual output which will be heard aurally or storage of information about instrument, pitch, tone, recorded sample to play, and other semantic data associated with the instrument. An instrument, for this purpose, is a channel (one type of sound) within the overall musical composition. Each instrument is then broken down by time code in step 515. So, for example, in a 30 second musical composition, each instrument/channel might be broken into 15 pieces or blocks of two seconds each. If there are four instruments, then there would be a total of 60 blocks (15 per instrument*4 instruments=60 blocks). Each block for each instrument broken down per period of time is then stored. When it is stored, this can be in volatile or non-volatile memory and can be stored long term, or as needed, per iteration of a puzzle/methods of the disclosed technology being created or carried out.

Each block is then represented with a visual version thereof, in step 520. This is accomplished by converting the audio of a block into a visualization of the sound waves, showing time versus amplitude or other elements which make up the sound. These blocks, in step 525, are then displayed out of order on a grid. They can be out of order by time or placed in a position of a different instrument. For example, the bass clarinet block for time 30 s(econds) to 35 s might be placed in a row of the grid labeled, or having indicia representative of a cello, and at a time 20 s to 25 s. If one selects the cello for playback, at 20 s they will hear the bass clarinet playing at what is 30 s in the musical composition. One selects pieces for playback or looks at their visualizations to determine where they belong in the grid.

This is further explained in steps 530 through 565. In step 530, it is determined if a move of a piece is received. This includes receiving data indicating that a block should be moved from one position on the grid to another. So, in our bass clarinet example, one might move it to the bass clarinet row, and then the block which occupied the spot where the bass clarinet block is moved to, is moved, in some embodiments, to the prior spot of the bass clarinet block. This occurs in step 545, where the block or blocks are moved and then, in step 550, the new positions of the blocks are displayed in a grid or otherwise in a displayed form. If a selection of a block is received in step 535, then the underlying sound associated with the visualization displayed on the block is played aurally in step 540.

The steps 530 and 535, checking if a move request or play/selection request is received, are carried out cyclically, until at least an instrument, or the entire set of blocks of pieces, is correctly placed in step 555. Once the pieces are correctly placed in order by instrument and/or time in step 555, the instrument is played in step 560, in embodiments of the disclosed technology, from beginning to end, or the time which is fully correct is played with all instruments together. When the entirety of the blocks is placed in the correct place by instrument and time, the entire composition can be, or is now, played in step 565. Before an instrument or composition is completely correct, the user is unable to hear the entire respective instrument or composition, in embodiments of the disclosed technology.

Figure 1:
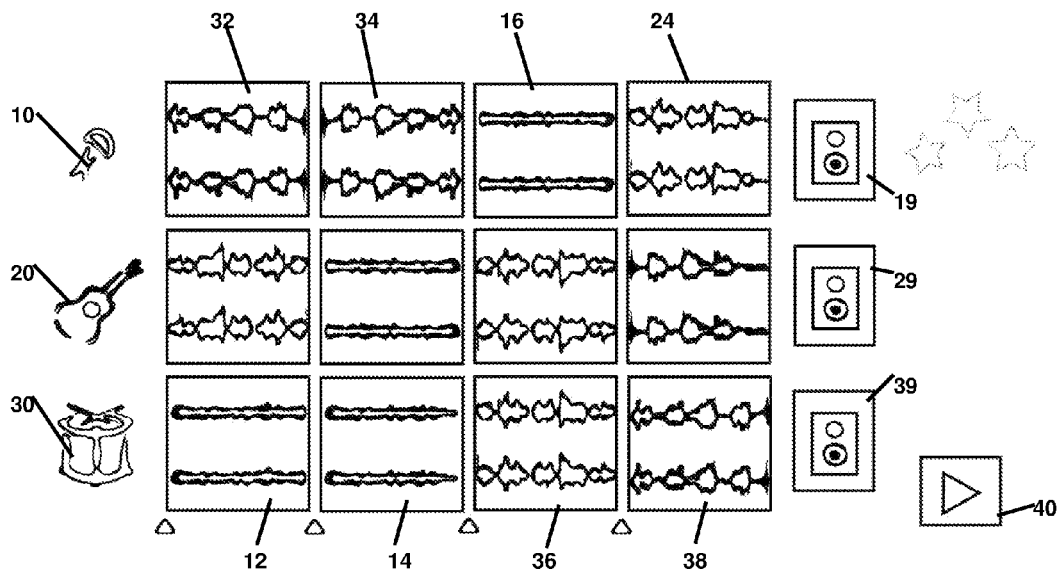
FIG. 1 shows out of order tracks and visualizations of specific time blocks of a musical composition, in an embodiment of the disclosed technology.

FIGS. 1-6 show visualizations of how the disclosed technology is carried out. FIG. 1 shows out of order tracks and visualizations of specific time blocks of a musical composition, in an embodiment of the disclosed technology. Here, a first instrument (voice) 10 is designated for the first row of the grid shown. In this small example, a three instrument version with four time pieces is shown, for a total of 12 pieces. On the second row is the second instrument (guitar) 20, and on the third row is the third instrument (drums) 30. One can turn on a row using respective selectors 19, 29, and 39, in order. One can play the entirety of the composition, as it is currently "arranged" or shown using play selector 40. Or, one can select one of the blocks and play that specific block. The blocks shown in this example, numbered across FIGS. 1-6, are four voice blocks 12, 14, 16, and 18; four guitar blocks 22, 24, 26, and 28; and four drum blocks 32, 34, 36, and 38. As one can see in FIG. 1, these blocks are at least partially or fully in incorrect time and/or instrument position. One can also see that each instrument has a different type of visualization. The voice 10 has blocks with a fairly consistent and small amplitude differentiating them from the guitar 20 and drums 30. However, the guitar 20 and drums 30, in this example, produce similar looking visualizations requiring one to select them to listen to and figure out which block is associated with which. (The numbering of the blocks is absent in actual embodiments of the exhibited version and is used here for discussion.)

Figure 2:
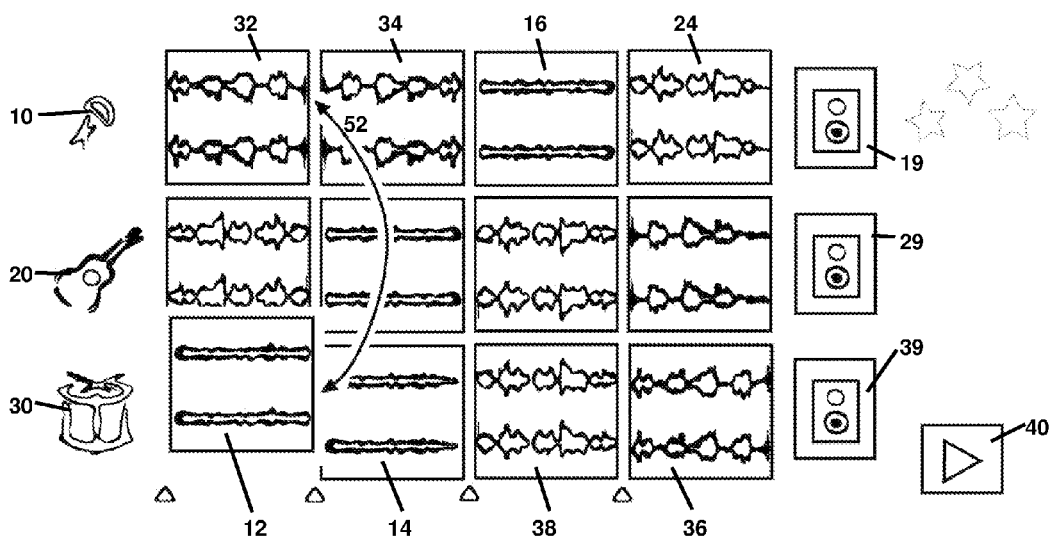
FIG. 2 shows a selection of, and listening to, specific blocks of the musical composition, as well as moving a block from one position to another, blocks of a musical composition, in an embodiment of the disclosed technology.

FIG. 2 shows selection of, and listening to, specific blocks of the musical composition, as well as moving a block from one position to another, blocks of a musical composition, in an embodiment of the disclosed technology. Here one selects block 12, realizing that it belongs to instrument 10, and moves it to a grid position in the first row for the voice instrument by pulling it along direction 52. The block 32 in that position then moves to block 12's prior position, in embodiments of the disclosed technology, and the musical composition, made up of the 12 blocks shown, begins to be arranged in proper order and by proper instrument. It should also be understood that the term "row" and "column" can be interchanged in embodiments of the disclosed technology such that a row includes cells lined up in the vertical and a column includes cells lined up in the horizontal or vice versa.

Figure 3:
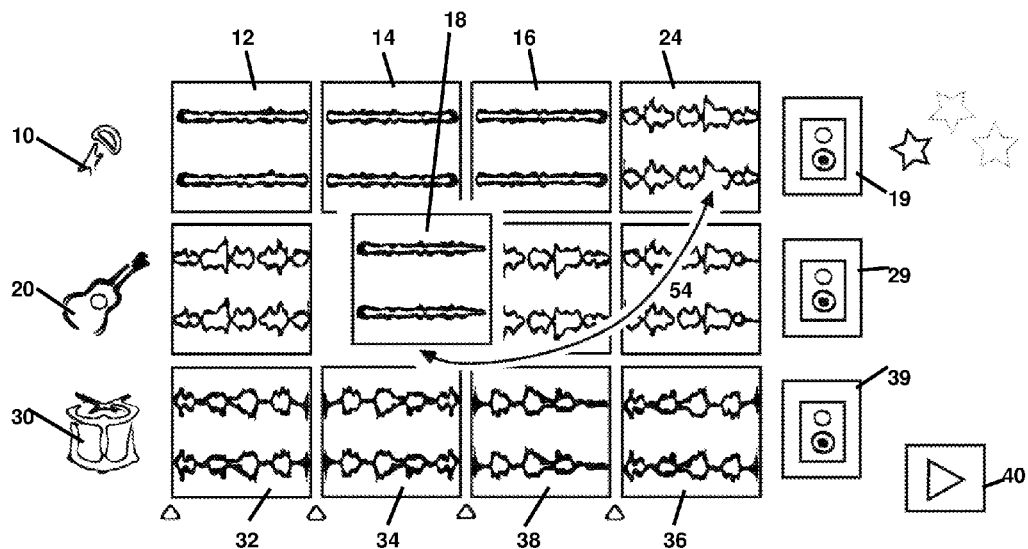
FIG. 3 shows a further selection of, and listening to, specific blocks of the musical composition as the blocks are placed with a correct instrument, in an embodiment of the disclosed technology.
Figure 4:
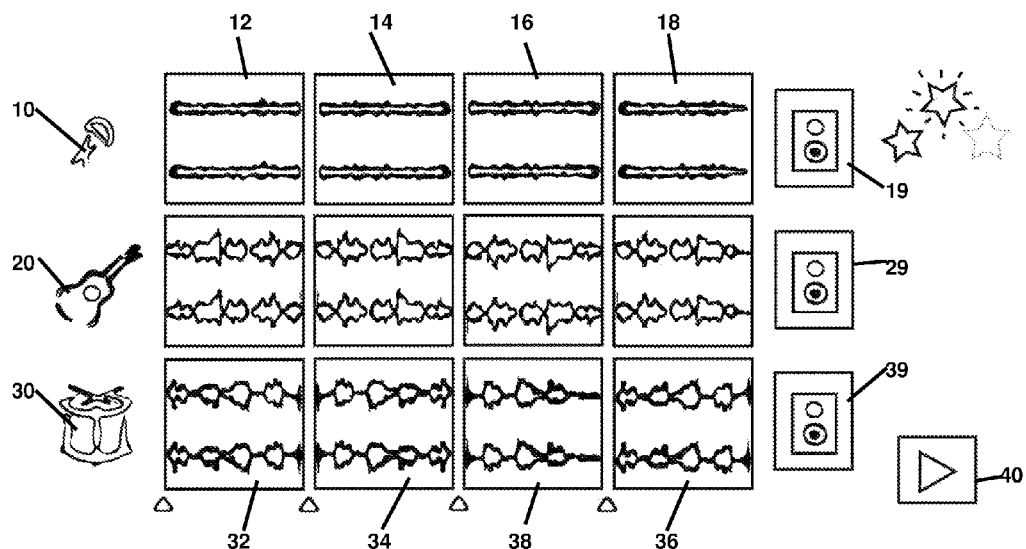
FIG. 4 shows ordering of blocks within each instrument, in an embodiment of the disclosed technology.
Figure 5:
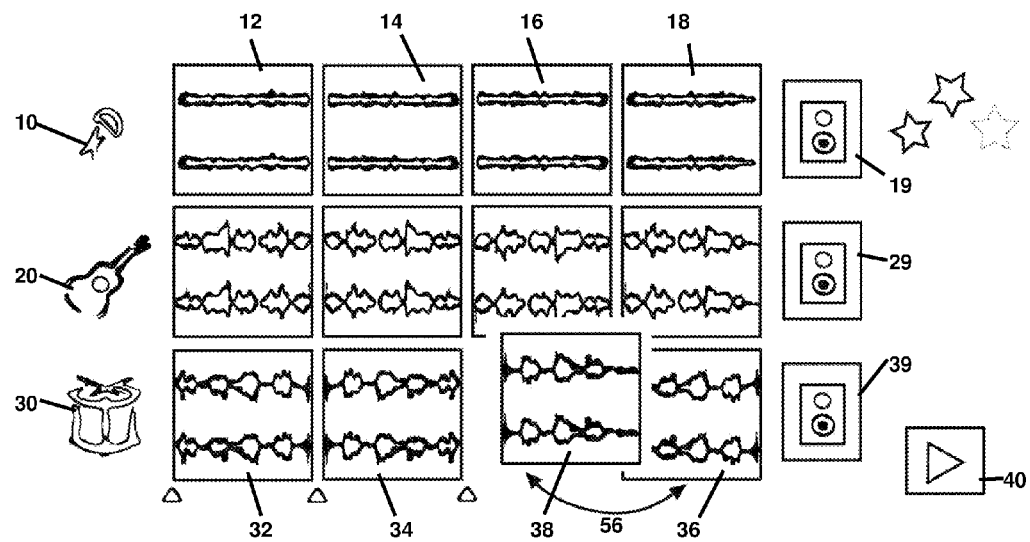
FIG. 5 shows a final rearrangement of two blocks to form a full visualization of the musical composition, in an embodiment of the disclosed technology.
Figure 6:
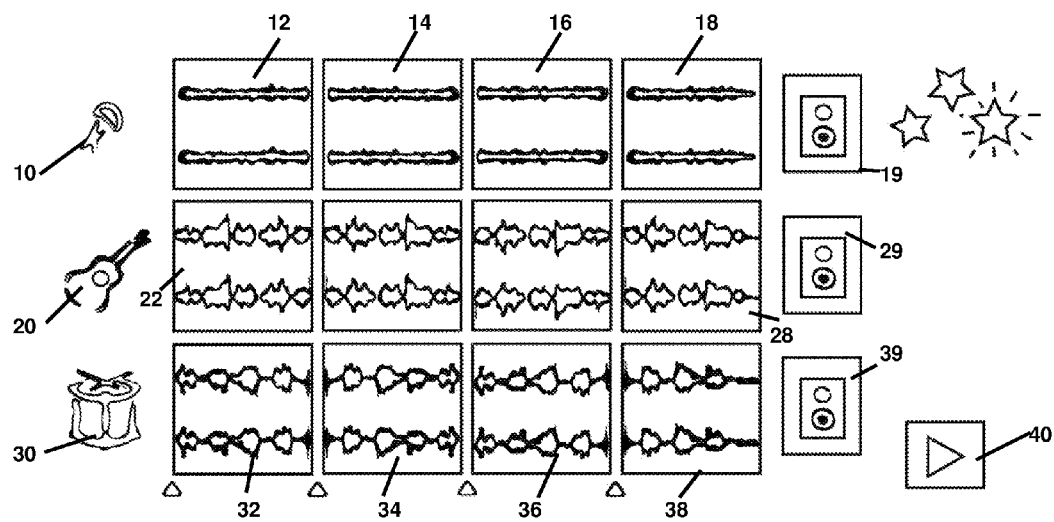
FIG. 6 shows the musical composition being fully arranged in time order and by instrument order, in an embodiment of the disclosed technology.

FIG. 3 shows a further selection of, and listening to, specific blocks of the musical composition as the blocks are placed with a correct instrument, in an embodiment of the disclosed technology. This time block 18 is moved into the position of block 24, and we can see that in FIG. 4 which shows ordering of blocks within each instrument, in an embodiment of the disclosed technology. Here, instrument 10 has its four associated blocks in order 12, 14, 16, and 18 and the instrument, when played such as by using selector 19 will play its part of the composition in order and in full. However, one can see that, if selector 39 is used to play instrument 30, the blocks are out of order and will produce something of a jarring sound from out of order playback. Therefore FIG. 5 shows the musical composition as it is being fully arranged in time order and by instrument order, in an embodiment of the disclosed technology. Here, blocks 38 and 36 are flipped in their position, and now all the pieces are in order for all the instruments by moving them into place after listening to, or looking at, the visualizations for the pieces as a whole and determining by way of sound and/or sight where to place each piece. In FIG. 6, the pieces are now in the correct position for playback, and the entire musical composition can be played as a totality of all its parts, with each piece which is associated with a specific time starting and stopping simultaneously as the next set of pieces for the next time block begins.

Figure 8:
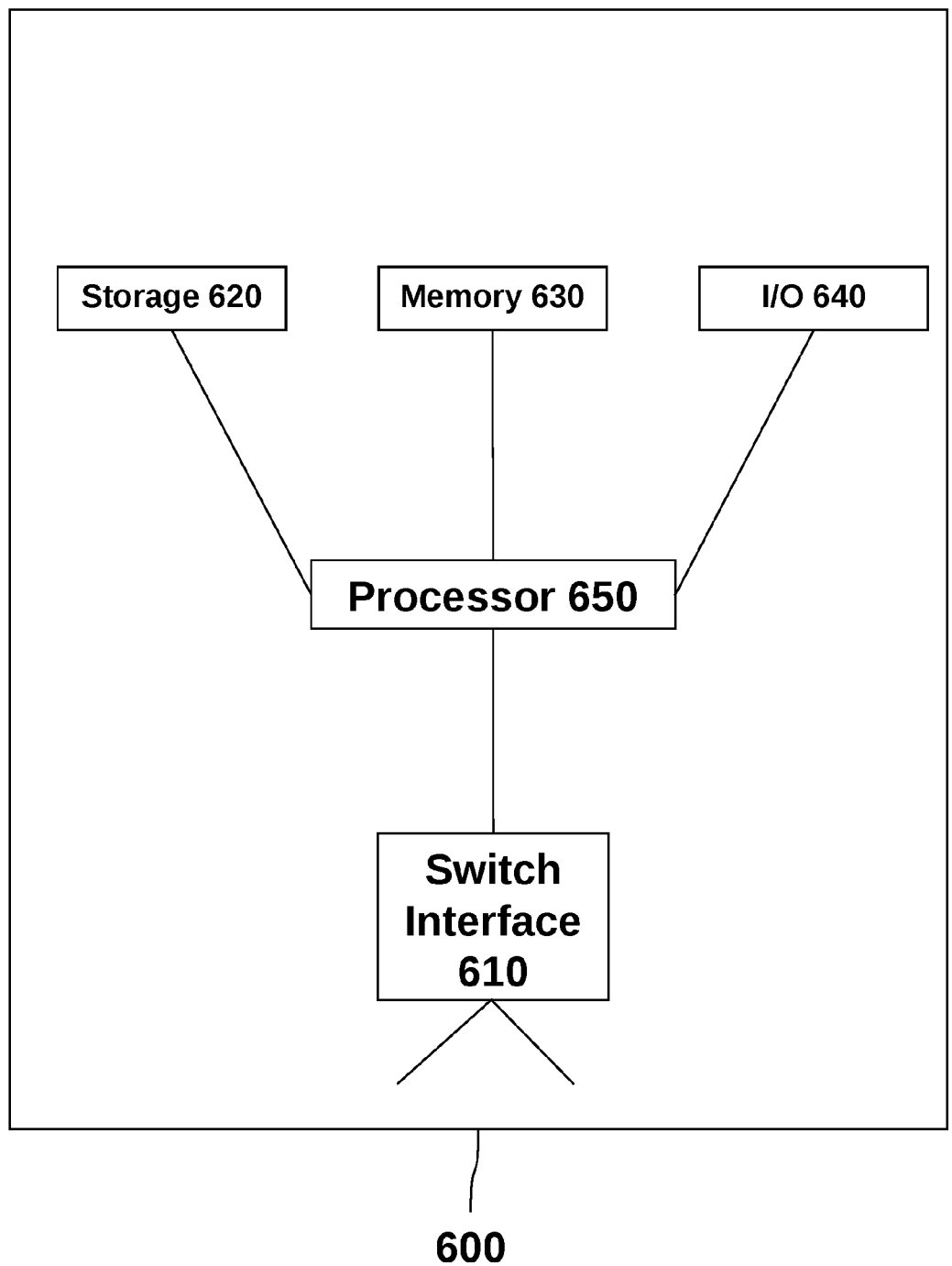
FIG. 8 shows a high-level block diagram of a device that may be used to carry out the disclosed technology.

FIG. 8 shows a high-level block diagram of a device that may be used to carry out the disclosed technology. Device 600 comprises a processor 650 that controls the overall operation of the computer by executing the device's program instructions which define such operation. The device's program instructions may be stored in a storage device 620 (e.g., magnetic disk, database) and loaded into memory 630, when execution of the console's program instructions is desired. Thus, the device's operation will be defined by the device's program instructions stored in memory 630 and/or storage 620, and the console will be controlled by processor 650 executing the console's program instructions. A device 600 also includes one, or a plurality of, input network interfaces for communicating with other devices via a network (e.g., the internet). The device 600 further includes an electrical input interface. A device 600 also includes one or more output network interfaces 610 for communicating with other devices. Device 600 also includes input/output 640 representing devices which allow for user interaction with a computer (e.g., display, keyboard, mouse, speakers, buttons, etc.). One skilled in the art will recognize that an implementation of an actual device will contain other components as well, and that FIG. 8 is a high level representation of some of the components of such a device, for illustrative purposes. It should also be understood by one skilled in the art that the method and devices depicted in FIGS. 1 through 6 may be implemented on a device such as is shown in FIG. 8.

Further, it should be understood that all subject matter disclosed herein is directed, and should be read, only on statutory, non-abstract subject matter. All terminology should be read to include only the portions of the definitions which may be claimed. By way of example, "computer readable storage medium" is understood to be defined as only non-transitory storage media.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

I claim:

1. A method of visual display and output of a musical arrangement comprising multiple instruments, comprising:
   dividing said musical arrangement into individual instruments;
   dividing said musical arrangement into a plurality of distinct time blocks, such that an individual block is created for each said individual instrument at a given range of time during said musical arrangement;
   creating a visual output of sound waves for each said individual block;
   creating a grid with a number of rows corresponding to a number of said individual instruments and columns corresponding to a number of said distinct time blocks for each said individual instrument;
   outputting each said individual block in a position on said grid such that at least one said individual block is associated with an incorrect time within said musical arrangement;
   receiving a selection of an individual block of said individual blocks and a location on said grid;
   moving a visual output of a block of said individual blocks at said location to a location on said grid of said individual block for which said selection was received creating a new musical composition; and
   moving said visual output of said block for which said selection was received to said location such that selecting a location where said block was moved to results in playback of a different portion of said musical composition.

2. The method of claim 1, comprising a step of receiving a selection of at least one said individual block; and
   outputting sound associated with said individual block.

3. The method of claim 1, wherein each said row of said grid comprises indicia representative of an instrument of said individual instruments; and
   said outputting further comprises outputting of at least one said individual block associated with an incorrect instrument.

4. The method of claim 3, comprising a step of receiving a selection of said indicia representative of an instrument; and
   outputting sound for a plurality of said individual blocks in a row of said grid including at least one output of sound associated with a different instrument than said instrument associated with said indicia selected.

5. The method of claim 1, comprising a step of rearranging each said individual block outputted on said grid, such that each block is in the same row as other said individual blocks associated with a particular instrument of said individual instruments such that a playback of an entire row of said grid results in a different musical composition being played than said musical arrangement.

6. The method of claim 5, comprising a step of rearranging each said individual block outputted on said grid, such that each is in order by time and associated individual instrument.

7. A method of scrambling and ordering a musical composition, comprising the steps of:
   breaking down a digitally stored version of said musical composition into blocks per instrument and per period of time, such that each block comprises sound for one instrument and one period of time;
   creating a visual representation associated with each said block;
   exhibiting said visual representation of each said block in a first order other than a linear time order of said musical composition creating a new musical composition such that said first order of each said block is a different than musical composition which has been scrambled;
   upon receipt of a selection of said visual representation for one of said blocks, playing a portion of said new musical composition, said portion associated with said selection of said one of said blocks;
   receiving a selection of an individual block of said individual blocks and a location on said grid;
   moving a visual output of a block of said individual blocks at said location to a location on said grid of said individual block for which said selection was received creating a new musical composition; and
   moving said visual output of said block for which said selection was received to said location such that selecting a location where said block was moved to results in playback of a different portion of said musical composition.

8. The method of claim 7, wherein in said first order at least some said visual representations of said blocks from different said instruments are adjacent to each other.

9. The method of claim 7, where said visual representation shows amplitude and period of sound waves for a respective said block.

10. The method of claim 7, wherein said visual representation comprises a grid with each said period of time on one axis, and each instrument on another axis.

11. The method of claim 10, wherein each said visual representation of each said block is swappable in position on said grid with another said block.

12. The method of claim 11, further comprising a step of receiving an indication that two blocks of said blocks are to be swapped in position on said grid.

13. The method of claim 12, wherein a selector for a row of said grid is exhibited and upon receiving data indicating a selection of said selector, audio associated with each visual representation within said row is played in an order exhibited in said grid.

14. The method of claim 12, wherein said musical composition, in its entirety is played aurally upon each said visual representation being placed in a correct said period of time, and with a correct said instrument in said grid, whereas before said correct period of time and said correct instrument were placed, a combination of said visual representations represented a different musical composition.

* * * * *